US006550017B1

(12) United States Patent
Moiin et al.

(10) Patent No.: US 6,550,017 B1
(45) Date of Patent: Apr. 15, 2003

(54) SYSTEM AND METHOD OF MONITORING A DISTRIBUTED FAULT TOLERANT COMPUTER SYSTEM

(75) Inventors: Hossein Moiin, London (GB); Peter Martin Grant Dickinson, Gosforth (GB)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/343,146

(22) Filed: Jun. 29, 1999

(51) Int. Cl.[7] .................................. G06F 11/00
(52) U.S. Cl. ......................... 714/4; 714/14; 714/22
(58) Field of Search ..................... 714/51, 56, 14, 714/22, 4

(56) References Cited

U.S. PATENT DOCUMENTS

| | | | |
|---|---|---|---|
| 4,263,647 A | | 4/1981 | Merrell et al. |
| 4,586,179 A | * | 4/1986 | Sirazi et al. ............. 714/14 |
| 4,887,076 A | | 12/1989 | Kent et al. |
| 4,956,842 A | * | 9/1990 | Said ......................... 714/41 |
| 4,964,017 A | | 10/1990 | Jindrick et al. |
| 5,392,192 A | | 2/1995 | Dunn et al. |
| 5,397,176 A | | 3/1995 | Allen et al. |
| 5,447,367 A | | 9/1995 | Wei |
| 5,513,068 A | | 4/1996 | Girard |
| 5,542,757 A | | 8/1996 | Chang |
| 5,547,272 A | | 8/1996 | Paterson et al. |
| 5,560,033 A | * | 9/1996 | Doherty et al. ............. 713/340 |
| 5,568,611 A | | 10/1996 | Khatri et al. |
| 5,884,988 A | | 3/1999 | Foo et al. |
| D425,879 S | | 5/2000 | Lee et al. |
| D426,198 S | | 6/2000 | Lee et al. |
| 6,230,181 B1 | * | 5/2001 | Mitchell et al. ............. 709/100 |

OTHER PUBLICATIONS

Vogt, "Improving the Reliability of Bus Systems: Fault Isolation and Fault Tolerance," Microprocessing & Microprogramming. vol 21, Nos. 1–5, Aug. 1987, pp. 333–338.
"Unattended System Monitor," IBM Technical Disclosure Bulletin, vol. 33, No. 3A, Aug. 1990, 3 pgs.
International Search Report, Application No. PCT/US 00/13457, mailed Aug. 31, 2000.

* cited by examiner

Primary Examiner—Robert Beausoliel
Assistant Examiner—Bryce P. Bonzo
(74) Attorney, Agent, or Firm—Meyertons Hood Kivlin Kowert & Goetzel, P.C.; B. Noël Kivlin

(57) ABSTRACT

A system and method for monitoring a distributed fault tolerant computer system. A hardware counter mechanism (e.g. a countdown counter) is reset repeatedly by a software reset mechanism during normal operation, thereby preventing the counter mechanism from reaching a count indicative of the existence of a fault. A unit provides a signal to a bus indicative of the status (ON or OFF) of the unit. A management subsystem defines a configuration for the distributed fault tolerant computer system. The management subsystem is responsive to status signals on the bus and selectively reconfigures a stored representation in response to changing status signals on the bus.

65 Claims, 6 Drawing Sheets

SYSTEM AND METHOD OF MONITORING A DISTRIBUTED FAULT TOLERANT COMPUTER SYSTEM

BACKGROUND OF THE INVENTION

This invention relates to a system and method for monitoring a distributed fault tolerant computer system. In particular, the invention is directed to monitoring and reporting the operation status of nodes of a distributed fault tolerant computer system. The invention can find application to the automatic configuration of a distributed fault tolerant computer system.

One application for a distributed fault tolerant system is in the telecommunications industry. The telecommunications industry is going through some fundamental changes that have caused a significant shift in the requirements placed on their information infrastructure. Deregulation of the services provided by the carriers, introduction of new wireless services, and the addition of information processing (IP) services have created new challenges and opportunities in this rapidly growing industry. The competition in the industry has resulted in significant reduction in the time available to service providers to test and develop their own systems.

Traditionally, telecommunication companies that have relied on hardware fault tolerant systems and extensive testing of their applications to discover system and application software faults. However, the competition and the need to bring new services to the market quickly means that such an approach is no longer possible in all cases if the service providers are to provide new services while maintaining the level of service and reliability that their customers are accustomed to.

Distributed Fault Tolerant (DFT) systems provide the basis for one approach specifically to address the requirements of a changing telecommunication industry. A DFT system has the potential to tolerate not only the failures of the hardware components of the system, but also the failures of its software elements. A traditional lock-step hardware fault tolerant system is perfectly capable of masking hardware component failures from its users but it is unable to accomplish the same for a software failure. The difficulty arises from the fact that the redundant hardware components of such a system execute the same set of instructions at the same time on effectively the same system and are, therefore, subject to the same set of software failures.

While it is possible to discover and correct "functional" bugs in the software by a rigorous qualification cycle, it is far more difficult to detect and correct the failures associated with the execution environment of a program. Such "Heisenbugs", as they are called, are rarely discovered and corrected during the normal testing and qualification cycle of the system and occur only under circumstances that are very difficult to reproduce. The observation that the execution of the same program on the same (or identically configured) system, but at a different time, does not result in the same "Heisenbug" is the key to making it possible to tolerate such failures via redundancy, fault isolation, and fault containment techniques. DFT is based on this observation and uses redundant hardware and software components to achieve both hardware and software fault tolerance by isolating and containing the domain of such failures to a single member of the distributed system. Accordingly, it is desirable that a DFT system should be able to identify at least software failures that lead to the inoperability of a node of the system.

Moreover, in the telecommunications industry, stringent timing and availability requirements are set. Most applications in this market differ from those in other commercial sectors by the requirement for a "real-time" behavior. This places the requirement on the computing infrastructure that must incorporate the notion of "real-time" into its design and effectively guarantee that certain actions occur within a specified period. While it may be acceptable for a "mission-critical" enterprise system to have a large degree of variance in the time that it takes to respond to the same service request at different times, such a non-deterministic behavior cannot be tolerated by a telecommunications computer system. In order to meet these stringent timing requirements, the industry has resorted to proprietary hardware and software components resulting in a complicated application development environment, increased time to market, and reluctance in adopting new and efficient programming techniques. It would be desirable to enable a DFT system to address the unique requirements of the telecommunications industry without introducing an unnecessarily complicated programming model. Thus, it would be desirable to use, wherever possible, standard Off-The-Shelf (OTS) hardware and software components that allow for application development in a modem environment. It would therefore be desirable to minimize the amount of special purpose hardware and software needed.

One of the most important requirements of a telecommunication computer system is its availability. This is typically measured in the percentage of time that the system is available. However, it can also be stated in terms of the time that the system is unavailable. From this figure it is possible to calculate the maximum length of service disruption due to a failure. However, such a derivation assumes that the maximum number of failures over a period of time is known and that failures (or unplanned outages) are the only cause of service unavailability. Instead, a second requirement is commonly used that determines the maximum length of the service unavailability due to a failure. Another requirement of a telecommunication computing system stems from its unique maintenance and service model. While it is perfectly reasonable to assume that an enterprise system will be serviced and maintained locally by a system administrator conversant in the current technology, such an assumption is not valid for a telecommunication system where the system is typically located in a Central Office (CO) miles away from the nearest suitable system administrator. This lack of trained service and maintenance personnel translates the implicit competence of such personnel into explicit system requirements. Accordingly, it would be desirable to provide a structure that provides the basis for achieving at least a degree of automation of fault reporting and system reconfiguration.

The invention seeks to provide a monitor system that provides the potential to address at least some of the problems and desires mentioned above.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a monitor system for a distributed fault tolerant computer system. The monitor system includes a counter mechanism operable to count from a reset value towards a fault value and to output a fault signal if the fault value is reached. A counter reset routine is implemented in software and is operable repeatedly to reset the counter mechanism to its reset value during normal operation of the counter reset routine, thus preventing the counter mechanism from reaching the fault value during normal software operation. A unit connectable to a bus to supply a status signal indicative of the status of the unit is arranged to be responsive to a fault signal being output from the counter mechanism to provide an OFF status indication to the bus.

In this manner, a monitor system is able to detect a fault in the software running on the node (for example if the operating system hangs) and to report this to the bus. This can be achieved through the minimum of special purpose hardware. Moreover, as will be described with respect to preferred embodiments of the invention, the monitor system provides the potential to achieve a degree of automation with respect to the reporting of faults and the configuration of the distributed fault tolerant system where hardware and/or software failures occur in a node and/or where a node is replaced and/or removed or added.

Preferably, each unit of respective nodes is connected to a respective channel on the bus, so that a fault condition from any particular unit can be identified by inspection of the channel on the bus. The channel could be implemented by, for example, time, phase or code division on a particular bus line or lines. In a preferred embodiment, which minimises the implementation logic required, each channel is a separate bus line.

A management subsystem is preferably employed to define a configuration for the distributed fault tolerant computer system. This management subsystem can be responsive to status signals on the bus and can be operable selectively to redefine the configuration of the distributed fault tolerant system dependent upon the state of the status signals. In this manner, a degree of automation with respect to the reporting of faults and the configuration of the distributed fault tolerant system can be achieved to take account of hardware and/or software failures that occur in a node and/or a situation where a node is replaced and/or removed or added.

The management subsystem can be responsive to respective status signals on respective channels to determine the state of respective nodes. The management subsystem can then be operable automatically to redefine the configuration of the distributed fault tolerant system in response to detection of a change of state of a node and to define a node as a member of the fault tolerant computer system when it is associated with an ON status signal.

The management subsystem could be provided centrally, possibly in one node, or alternatively could be provided at each node of the distributed fault tolerant computer system.

The counter mechanism could be formed of a hardware counter with a gate responsive to the counter reaching the fault value to pass a fault signal to the unit. The unit can be a power supply unit, and can be operable to turn off in response to a fault signal output by the counter mechanism. In this manner, the power supply for node that has developed a fault can be turned off.

In a preferred embodiment, each node includes two power supplies, with respective counter mechanisms, such that a fault in the power supply or in the associated counter mechanism will not result in the whole node being powered down. In such a preferred embodiment, first and second counter mechanisms and first and second power supplies are provided, both counter mechanisms being responsive to a common counter reset routine. Thus, where there is a software or hardware failure that prevents the counter reset routine from resetting the counter mechanisms, both counter mechanisms output a fault signal that causes both power supplies to power down. As a result, the node will have been powered down and two OFF signals will have been provided to the bus, one for each power supply unit. The absence of an ON status for the power supply units of the node can thus be identified by the management subsystems as indicative that the node has failed, and result in a reconfiguration of the fault tolerant computer system by the management subsystem.

In accordance with other aspects of the invention, there is provided a node of a distributed fault tolerant computer system including such a monitor system, and indeed a distributed fault tolerant computer system including a plurality of such nodes. In accordance with a further aspect of the invention, there is provided a method of monitoring operation of such a node of a distributed fault tolerant computer system.

An embodiment of the invention can thus provide a mechanism that allows for the automatic detection and reporting of a fault, whether hardware and/or software, which causes a delay in the generation of a counter reset signal by software operating at the node. The absence of such a reset signal can be indicative of a complete failure at the node, or alternatively a failure that means that the node is no longer able to meet the stringent real-time operation requirements of the telecommunications industry. Accordingly, an embodiment of the invention enables the automatic detection and reporting of such errors and provides the basis for enabling at least a degree of automatic reconfiguration of the distributed fault tolerant computer system in the event of such a fault occurring at a node.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
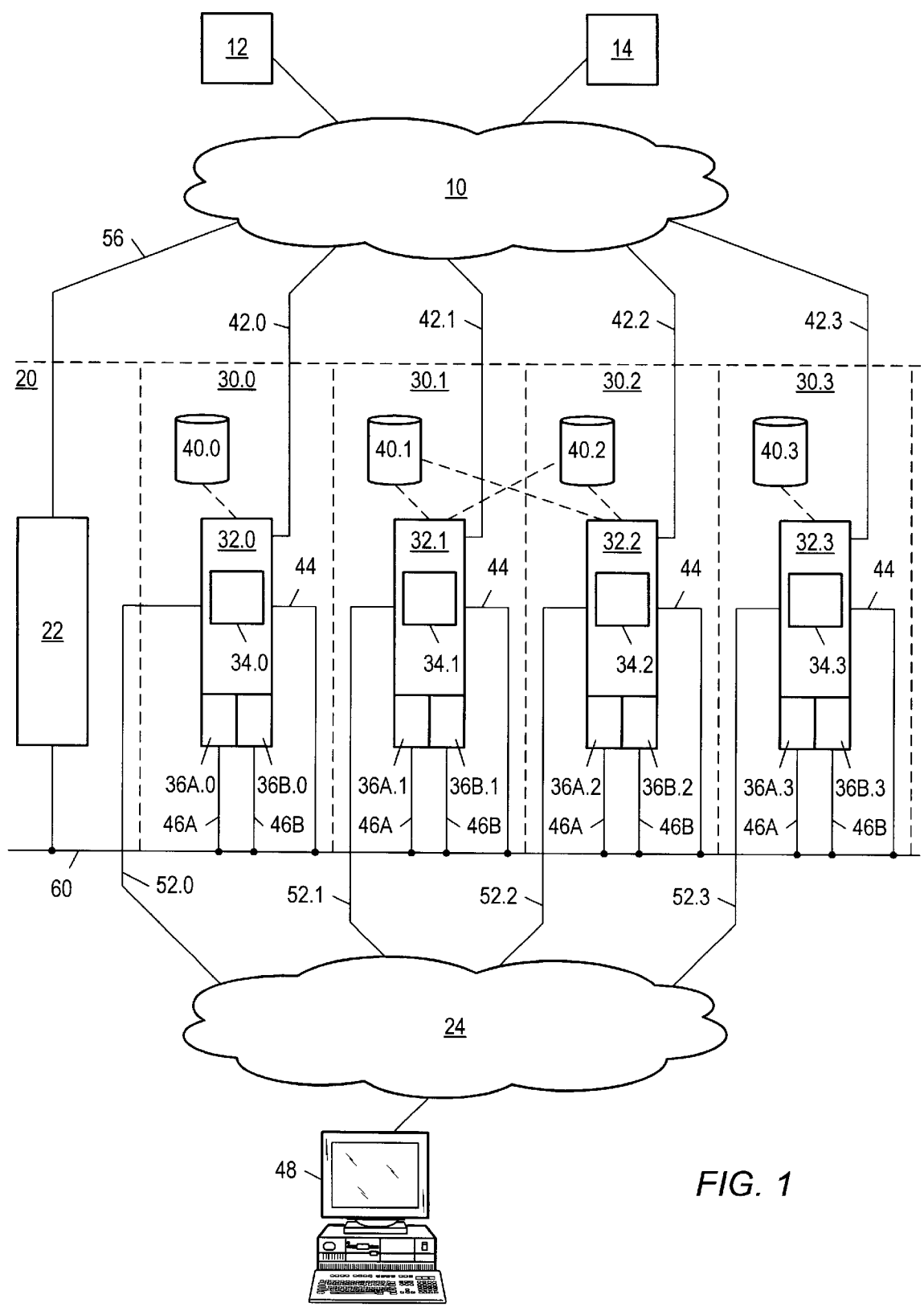
FIG. 1 is a schematic overview of a distributed fault tolerant computer system incorporating an embodiment of the invention.

FIG. 1 is a schematic overview of an example of a four-node DFT system 20 forming an exemplary embodiment of the invention. Four nodes 30.0, 30.1, 30.2 and 30.3 are illustrated in this exemplary embodiment for ease of representation. However, in other embodiments of the invention, more or less nodes may be provided. The number of nodes to be supported is constrained by the hardware available. For example, there may be more than four nodes, typically eight or more nodes.

The public network 10 illustrated in FIG. 1 can be any telecommunications network that can marshal the requests from clients, for example clients 12 and 14, to the DFT system 20.

Each of the nodes 30.0–30.3 comprises a processing unit 32 including at least one processor 34, storage 40, and first and second power supply units (PSUs) 36A and 36B. Software is operative in each processing unit 32 to perform appropriate processing of tasks in each node 30.

Respective connections 42.0–42.3 are provided between the public network 10 and each of the nodes 30.0–30.3. A conventional mechanism (software and/or hardware) can be provided in each of the nodes 30.0–30.3 to detect failures of a corresponding connection 42.0–42.3 to the public network 10 and to remove the node from the DFT system 20. In the present instance, a node 30.0–30.3 is removed from the system by turning off the power supply units 36A, 36B for the node (e.g., 36A.0 and 36B.0 for node 30.0).

Each of the power supply units 36A, 36B has a respective connection 46A, 46B to a redundant maintenance bus 60. The bus 60 provides a separate control channel, in the present instance a separate control line 50A, 50B, for each power supply unit. In other words, the redundant maintenance bus 60 has two control lines 50A.X, 50B.X for each node 30.X (where X=0, 1, 2, etc.). Each node 30 also has a connection 44 between the processing unit 32 and each of the control lines 50 of the bus 60. Each node 30 is thereby able to detect and sense the signals on each of those control lines, the signals representing the status of the power supply units of each of the nodes. Although, in the present example, each node is able to detect the control signals on each of the control lines, in another example, each node could be arranged to detect the signals on the control lines apart from those relating to its own power supply units. Also, although in the particular example a separate control line is provided for each power supply unit, in another embodiment, one or more signals could be combined on a single control line or a group of control lines, through the use of, for example, time, phase or code division multiplexing, such that each power supply unit 36A, 36B is connected to a respective control channel on the bus 60.

In an embodiment of the invention each of the nodes 30 is formed as a separate unit connected via a backplane, which backplane supports the redundant maintenance bus 60. However, the physical layout of the various units is not critical to the invention, and many alternative configurations are possible.

Each of the nodes 30.0–30.3 is also connected by a respective connection 52.0–52.3 to a private network 24. The private network is used to exchange control information between the nodes, and/or to enable programming and control of the nodes. One or more external management stations 48, each in the form of a personal computer or workstation, can be provided for entering control information and for displaying information relating to the operation of the distributed fault tolerant computer system. The personal computer(s) or workstation(s) 48 can have a conventional construction with a processor, memory, user input and display devices, etc. Alternatively, the function of a management station 48 could be fulfilled by one of the nodes 30.0–30.3, or the partition monitor 22, of the distributed fault tolerant computer system 20, assuming that the node concerned has user input and display equipment and appropriate management logic.

The partition monitor (PM) 22 is connected to the public network 10 via a line 56 and to the redundant maintenance bus 60 via a line 58. In the present embodiment, the partition monitor 22 must be provided with some intelligence, but it does not need to have a central processing unit. The partition manager is operable to control the partition of shared storage between the nodes of the distributed fault tolerant computer system in order to avoid data inconsistency. For example, as shown in FIG. 1, the nodes 30.1 and 30.2 share the storage units (e.g. disks) 40.1 and 40.2. The partition monitor 22 is thus able to ensure that only one of the processing units 32.1 and 32.2 has access to any particular region of the storage units 40.1 and 40.2 at any one time. This can avoid a situation where both of the processing units 32.1 and 32.2 write to the same location in storage, which could cause data inconsistency.

The partition monitor 22 resides on an external box. It receives connectivity information from each node through a mechanism other than the private network (for example, through RS-232 connections). Based on this information the partition monitor decides if there is a partition in the private communication medium and selects an "optimal" distributed system from the original system. The partition monitor 22 accomplishes this by having the authority to turn the power off to the nodes that lie outside of this optimal distributed system. The PM is responsible for ensuring that there is one and only one fully connected system operating as a distributed fault tolerant system at any given time. It should be noted that a failure of the partition monitor 22 does not affect the correct operation of the system as long as it is corrected before a partition occurs in the system.

Figure 2:
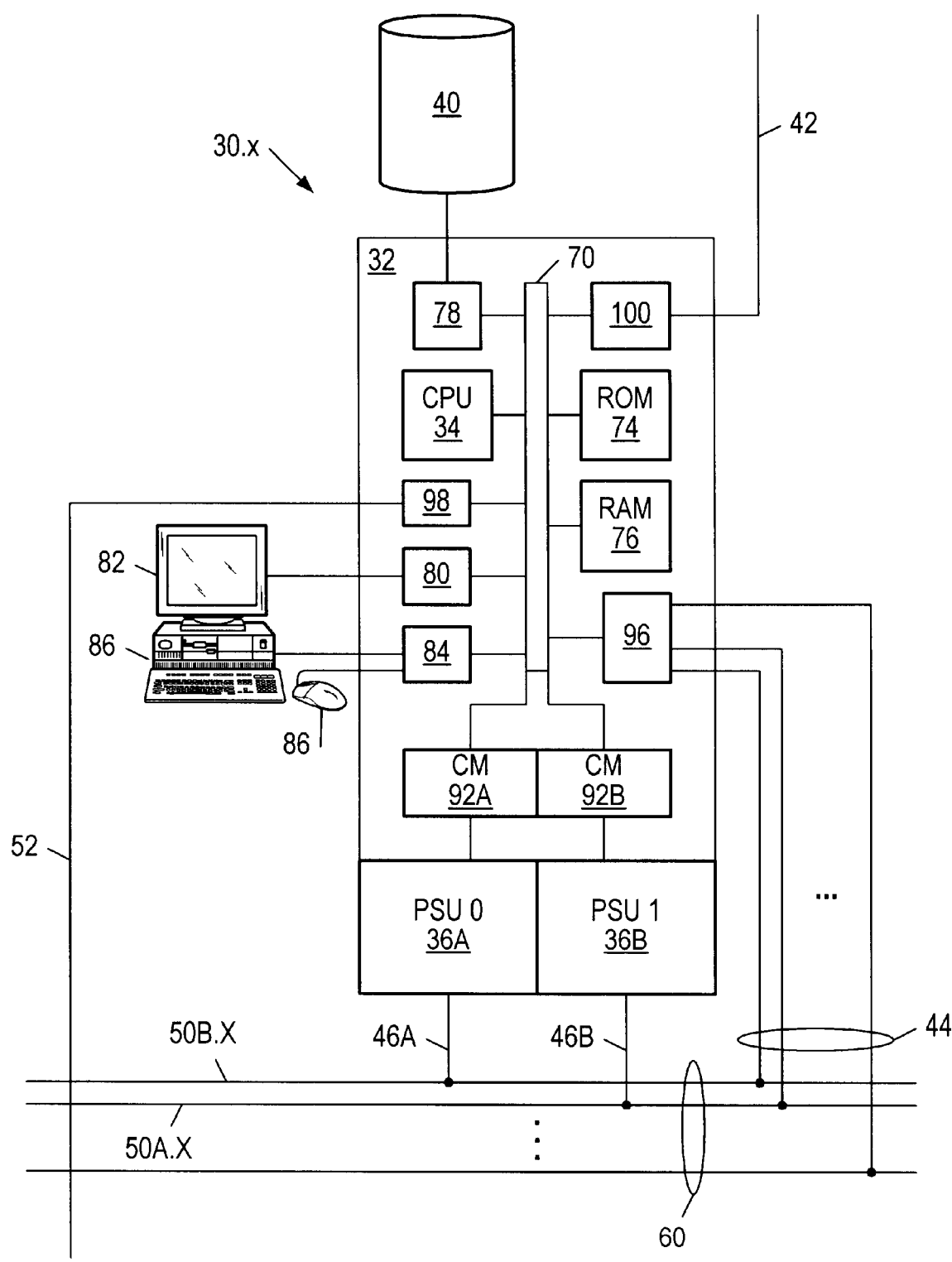
FIG. 2 illustrates aspects of a node of the system of FIG. 1.

FIG. 2 is a schematic overview in more detail of a possible configuration of a node 30 (30.X). As shown in FIG. 2, the node 30 includes a processing unit 32, a first power supply unit 36A and a second power supply unit 36B. The processing unit 32, in the present instance, includes one or more processors (CPUs) 34, connected to a bus 70. Also connected to the bus 70 is read only memory (ROM) 74 for control code and a random access memory (RAM) 76 for program code and data. A storage adapter 78 connects the storage 40 to the bus 70.

Optionally, a display adapter 80 connects a display device 82 to the bus 70 and/or a user input adapter 84 connects a keyboard and/or other user input devices 86 to the bus 70. The display and user input devices would be needed if user information is to be input and/or output at the node, for example, if the node acts as a management station as mentioned above. However, such devices are not essential otherwise, as user input and output can be provided via the connection 52 to the private network 24.

A first communications interface 100 is connected via the line 42 to the public network 10. A second communications interface 98 is connected via the line 52 to the private network 24. A third communications interface 96 is connected via a plurality of lines 44 to respective control lines 50 of the redundant maintenance bus 60. A first counter mechanism (CM) 92A is connected to the first power supply unit 36A. A second counter mechanism (CM) 92B is connected to the second power supply unit 36B. It should be noted that the structure of the node 30 illustrated in FIG. 2 is merely illustrative of a possible construction of the node 30. In another embodiment, the node 30 may be implemented with modifications to the arrangement shown, or indeed may be implemented in a significantly different manner.

Figure 3:
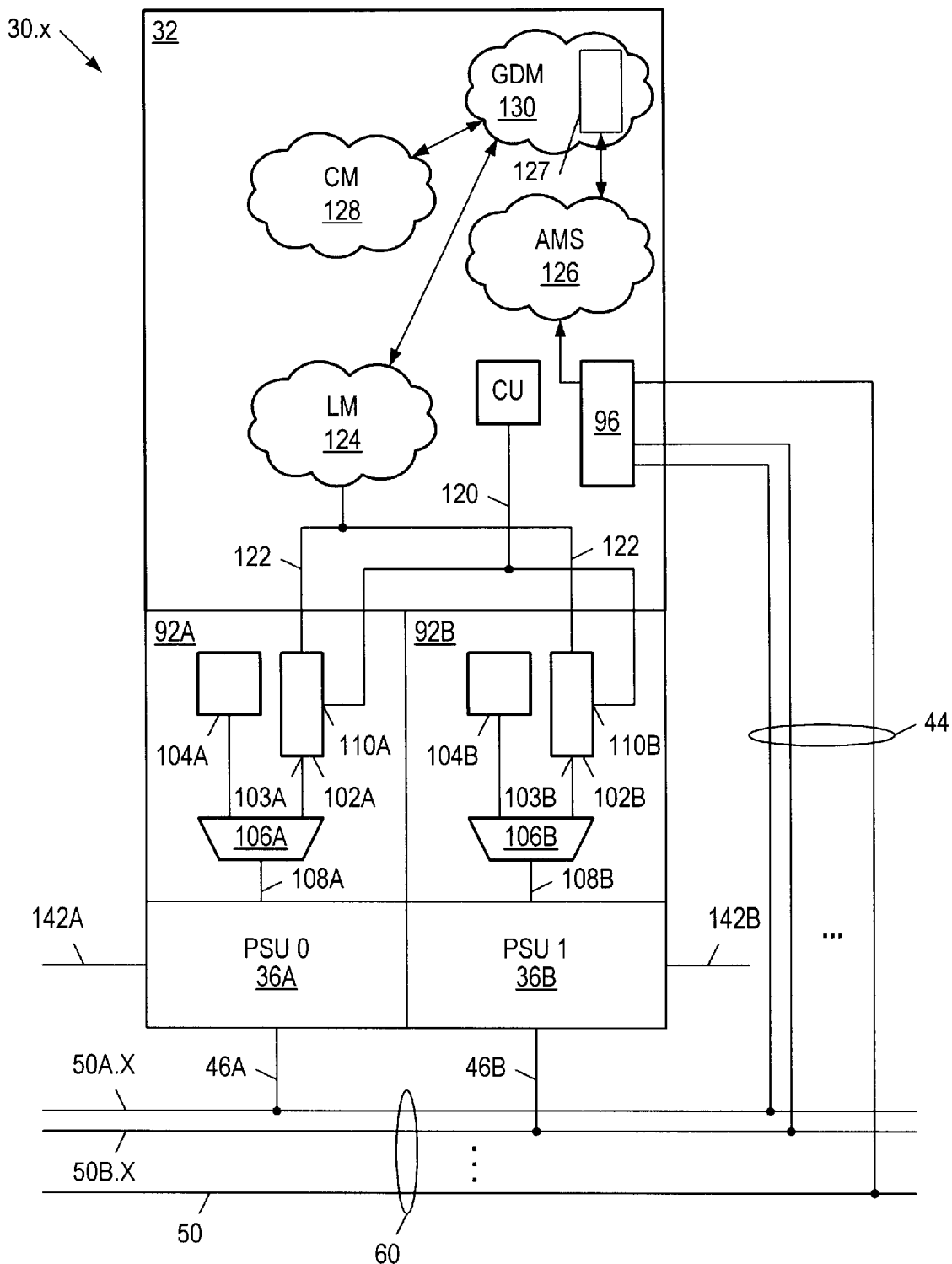
FIG. 3 illustrates further aspects of the node of FIG. 2.
Figure 4:
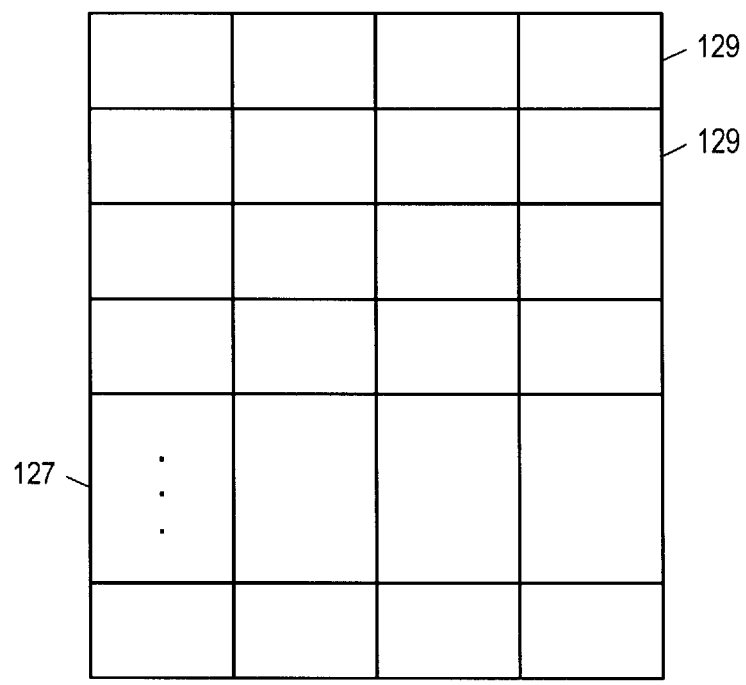
FIG. 4 illustrates a configuration table of an embodiment of the invention.

FIG. 3 illustrates further aspects of a node 30 in more detail. In particular, FIG. 3 illustrates the counter mechanisms 92A and 92B in more detail and also illustrates various software components operable at the node. The counter mechanisms 92A and 92B can detect failure of the node and can provide the ability to power off the power supply units 36A and 36B for the node.

The counter mechanism 92A includes a hardware counter 102A, a gate 106A and a fault signal source 104A (e.g., a memory location containing a signal value, or a source of a potential). The counter 102A receives a hardware generated clock signal CK (e.g., from the clock source for the processor 34) from a line 120 at an input 110A causing the counter to count from a pre-set value to a fault value, for example from a predetermined count value (possibly the maximum count of the counter) down to zero. If the counter reaches the fault value (e.g., zero), a signal is output at 103A to the gate 106A for causing the gate to output a fault signal 108A to be passed to the power supply unit 36A.

To avoid the counter counting down to the fault value, a liveliness monitor (LM) 124, implemented in software, regularly supplies a reset signal on line 122 to reset the counter 102A to its reset value. The liveliness monitor 124 is a user-land local daemon. In the present example it is defined in the real-time scheduling class of the Solaris operating system that is responsible for ensuring that a node's essential hardware components are functional and that the operating system (OS) is alive and making progress. The frequency of repetition of the reset signal 22 is set to occur sufficiently often that, during normal operation of the software and hardware of the node 30, the counter 102A never reaches the fault value. For example, the liveliness monitor 124 can be arranged to generate two successive reset signals during the period within which the counter 102A would normally count down from its reset value to the fault value.

The second counter mechanism 92B has the same structure as the first counter mechanism 92A. Thus, there is a counter 102B corresponding to the counter 102A that receives the clock CK at an input 102B from the line 120 and a software generated reset input from the liveliness monitor 124 via the line 122. In the present embodiment the counters 102A and 102B are arranged to count over the same range at the same rate. There is also a gate 106B corresponding to the gate 106A. Should the counter 102B reached its fault value, then a fault signal 104B will be passed via the line 108B to the second power supply unit 36B.

Thus, each of the counters 102A, 102B of the respective counter mechanisms 92A, 92B receives the same software generated reset signal from the line 122. If only one of the counter mechanisms 92A or 92B reaches its fault value, this is indicative that one of the hardware counter mechanisms 92A or 92B is faulty. In this case only one of the power supplies 36A and 36B will shut down, and one will remain in the ON state.

If both of the counter mechanisms 92A and 92B reach their respective fault values, this is indicative that the liveliness monitor 124 has not applied a reset value to the respective counters. This in turn is indicative that there is either a software fault, or a hardware fault which results in the liveliness monitor not timing the next reset signal at the correct timing. In either case, where both counters 102A, 102B reach the fault value, it is then necessary to remove the node concerned from the distributed fault tolerant computer system as the node appears no longer it to be able to operate reliably in the manner required, for example, to provide real time processing in a telecommunications system. In the present example, a node is removed from the distributed fault tolerant computer system by turning off the power supply units for that node. This is to be achieved by providing a fault signal 108A, 108B from each of the counter mechanisms 92A, 92B to the respective power supply unit 36A, 36B, which fault signal causes the respective power supply unit 36A, 36B to "panic" and to turn off.

During normal operation of a power supply unit, for example power supply unit 36A, an ON signal is supplied on line 46A to a corresponding line 50 of the redundant maintenance bus 60. When the power supply unit 36A is caused to panic, and to turn off, it is arranged that the state of the signal on line 46A is inverted to indicate to the respective control line that the power supply unit is OFF. Thus, for example, a logic one signal can be supplied to the control line 50 on the bus 60 during operation of the power supply unit, whereas this signal is removed, and is effectively replaced by a logic zero signal, when the power supply unit turns off.

FIG. 3 illustrates a further software component, the management subsystem (AMS) 126, which is responsive to the signals at the communications interface 96. This interface 96 is connected via the lines 44 to respective control lines 50 on the redundant maintenance bus 60. The management subsystem 126 is responsible for the initiation of reconfiguration and recovery actions in case of a failure. Such actions are typically specified by the application programs or by scripts. The management subsystem 126 is able to detect a change in the signals that are supplied on the respective lines 44 from the bus 60 as representative of a change in status of at least one of the power supply units 36A, 36B of the respective nodes 30. The management subsystem 126 is arranged to analyze the status of the signals for the respected nodes. Where at least one ON signal is applied in respect of a power supply unit 36A, 36B for a node 30, that node 30 is considered to be a member of the distributed fault tolerant system 20. The management subsystem 26 is thus able to configure the structure of the distributed fault tolerant computer system incorporating that node 30. If, however, there is no ON signal associated with any power supply unit for a node (or potential node position in the network), then it is assumed that a node is either absent, or inoperative. As a result, it is not configured as part of the distributed fault tolerant system 20 by the management subsystem 126.

Also shown in FIG. 3 is the connectivity monitor (CM) 128. This is another real-time daemon that is responsible for monitoring the health of the private communication medium and providing a logical connection between any pair of nodes in the system.

A global database manager (GDM) 130 forms a small and restricted database subsystem that maintains the list of resources and their current owners and their backups.

Not shown in FIG. 3 is the partition monitor 122. While each node of the system is fitted with a liveliness monitor 124, a local copy of the global database manager 130, a connectivity monitor 128 and a management subsystem 126, there is only one partition monitor 22 in the entire system.

The management subsystem 126, the liveliness monitor 124 and the connectivity monitor 128 store their necessary data in the global database manager 130. The global database manager can be modified by the user so that the system may grow, shrink, or be upgraded without loss of service. The global database manager 130 is kept consistent throughout the life of the system, but is not guaranteed to be persistent after a distributed fault tolerant system is entirely powered off.

The management subsystem 126 maintains a configuration 127 for the fault tolerant computer system in the global database manager 130. This includes a record of the nodes on which respective processes are performed in the distributed fault tolerant computer system. This can be stored as a configuration table 127 in the database, on a per row basis as: a resource; an initial master; possible backup master(s); and an automatic switch-overflag. Each row 129 corresponds to a system resource. The initial master is the physical node of the system that masters the resource if there are no failures in the system. The backup masters are the potential nodes that can master the resource should the initial master fail and the flag is used to determine if the mastering of a resource should be returned to the initial master if the master joins the system after it has been out of the system. The rest of data in the database identifies the information about the system, its members and their connectivity. This allows the system to grow and shrink with out a complicated procedure.

Thus, the data in the configuration table 127 is representative of the status of the power supply units 36 of the nodes 30 and records the nodes on which respective processes are performed in the distributed fault tolerant computer system. Through the initial and possible back-up masters, redundancy can be provided for enhancing fault tolerance.

The management subsystem 126 is able to detect changes in the operating status of the nodes through monitoring the signals on the bus 60, and when a change in status is detected, to determine from the data in the configuration table 127 whether a reconfiguration is needed. If so, the management subsystem 126 can cause the reconfiguration to be initiated. This could be effected by alerting an operator so that the operator can effect this manually, or by activating an automated process. The actual manner in which reconfiguration is performed could be carried out in many different ways, and does not form a part of the present invention.

Figure 5:
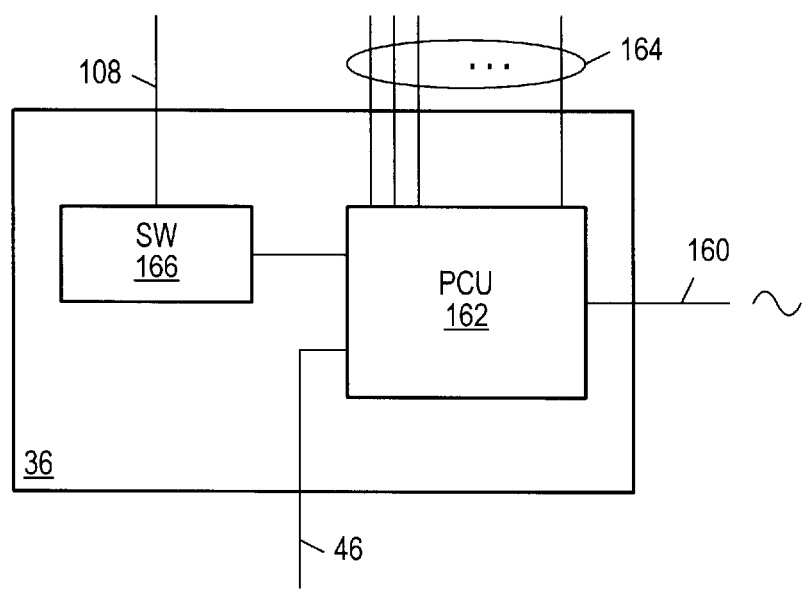
FIG. 5 illustrates a power supply unit of the node of FIGS. 2 and 3.

FIG. 5 illustrates an example of a power supply unit (e.g. power supply unit 36A or 36B) in more detail. The power supply unit receives a power conversion unit (PCU) 162 that receives an external mains supply at 160 and provides appropriate internal supply outputs at 164. The power supply unit 36 also includes an on/off switch (SW) 166 controlled by an input at 108 from the output of the counter mechanism 92. During normal operation (ON state) of the power supply, a voltage is supplied via line 46 to a line 50 of the redundant maintenance bus 60. If, however, the power conversion unit 162 is turned off by the switch 166 in response to a fault signal at the input 108, then a voltage is no longer supplied by the power supply 36 via the line 46 to the line 50 on the redundant maintenance bus 60. The absence of the voltage forms an OFF signal from the power supply to the line 50 on the redundant maintenance bus 60.

The liveliness monitor makes use of capabilities of the hardware to detect the failures of the node and can be implemented by a very simple user process in the real-time scheduling class. Alternatively, this can be implemented by a multi-layered set of processes with different time-out values and different counters. In such a scheme, the failure of any one process leading to resetting of its counter will cause an entire node to fail. Either implementation can be referred to as a watch-dog process. In the present embodiment, the liveliness monitor is implemented as a daemon. The liveliness monitor is responsible for updating the counter(s) 102A, 102B with frequency F, where F is large enough to prevent any false failures. The counters 102A, 102B, which in the present instance are implemented as countdown counters, are used to detect failures of the system and to turn the power off by causing the Power Supply Unit (PSU) to panic. To ensure that the failure of this circuitry or the PSU itself does not remove the node from the distributed system, the counters with the associated circuitry and PSU are duplicated. As mentioned above, each PSU presents its current state, on or off, to a redundant maintenance bus. The bus (taken as a whole) is assumed by the software to be reliable so that the management subsystem 126 running on a node of the distributed system can read it and decide the correct status of each node. It is to be noted that a node is considered operational if any, or both, of its PSUs are in the ON state. FIG. 3 is effectively a graphical representation of the membership monitor that is built out of the liveliness monitor 124, the additional counter mechanism hardware, and a thread of the management subsystem 126. This thread, itself, in the real-time scheduling class of Solaris with the highest priority, is responsible for reading the implicit membership information available on the maintenance bus and starting a reconfiguration if certain conditions are met.

The liveliness monitor 124 is operable to reset, or refresh, the hardware counter 102 and then to sleep. After a given period, or in response, for example, to an operating system signal, the liveliness monitor is operable to determine whether the counter should be reset, or refreshed again. If not, then the liveliness monitor sleeps again. This cycle is repeated a given number of times until the liveliness monitor determines that it should reset, or refresh, the hardware counter again. The number of cycles (which can be from zero upwards) is determined as a factor of the length of the sleep period versus the frequency with which the hardware counter should be reset, or refreshed. The liveliness monitor can be arranged to provide a software count of sleep periods, or to compare real elapsed time from a last resetting or refreshing of the hardware counter to a desired period between resetting or refreshing of the hardware counter, or any other appropriate mechanism. After resetting or refreshing of the hardware counter, the liveliness monitor sleeps again, and the cycle(s) referred to above are repeated.

The global database manager 130 forms a central repository of the system resources, their physical masters, and their backups. It is a system wide and fault tolerant service providing a global and consistent name space and repository services. The global database manager 130 provides a generic database service allowing database entries to be added and removed consistently in the system. In addition, the database can be queried from any node of the distributed system. The global database manager 130 is used by the infrastructure of the system to store configuration parameters, and can be extended to include runtime data, that must be maintained consistently across the system. A two-phase commit protocol can be used to implement the global database manager such that the consistency of the database is guaranteed following an update. The global database manager 130, through the management subsystem 126, allows a user to update the database via a command line interface and exports a library intended for the other programs in the system. The global database manager 130 allows for the rolling upgrade and the addition and removal of nodes or services by the system administrator.

The global database manager 130 could be implemented as a distributed program. However, this complication can be avoided if the administration model is simplified and it is ensured that when a global database manager update operation takes place, this is done on all nodes of the system at approximately the same time. If manual maintenance of the consistency of individual configuration files is employed, care would be needed to avoid inconsistencies, as this could result in catastrophic failures that can not be tolerated in the telecommunications industry. Maintaining consistency can become a formidable task when the number of files to maintain grows large. Moreover, in a distributed system, if some runtime data is to be kept consistent, then this could result in an unmanageable and complex process for updates. A properly designed distributed GDM can recover the most up to date version of the data after a restart of the distributed system and can propagate that version to all the nodes of the system.

Such a distributed database could be employed, but it is not a requirement for the present distributed applications. It should be noted that a distributed global database manager is not necessary for non-distributed applications. Also, the global database manager can be used for static information and does not need to contain any runtime data. In view of this, in the present embodiment, the complications of a distributed global database manager are avoided and a centralized system can be employed. One node of the system (or the partition monitor, if it has appropriate intelligence) is assumed to hold the master copy of the database and it is the only node in the system that can allow for modifications to it. All other nodes have a slave copy that is held in a read-only file. It is possible to make the mastering of the database a user-selectable service so that a new master can be selected if the old one is out of service for any length of time. Once an update to the master copy is done, the master global database manager ensures through an appropriate protocol that all slaves have the new updated copy. When a node joins the system, it will copy the relevant database information from the master global database manager by sending a new member joining message to all the nodes of the system that it knows about from its static (and not in the global database) information. If the node does not hear back from the master of global database manager it will panic the OS to indicate that a new master must be selected or that dual failures of the private communication medium has occurred. If an old master is coming back to the system after being out, it can identify itself, copy the data from the current master and resume being the master of the global database manager. When a node is the only member of the system, and therefore, the default master of the global database manager, special administrative commands are required.

The connectivity monitor 128 cooperates with the partition monitor 22 to discover failures of the private communication medium 24 and to mask them from the application programs if it is able to do so. The connectivity monitor 128 on each node 30 of the distributed system sends its connectivity graph to the partition monitor and it enables a logical connection between the nodes 30 of the system that is built on top of redundant physical links. This allows the other modules of the system and the application processes (where distributed applications are supported) to communicate via a fault tolerant link and be immune from the failures of the private communication medium 24. The connectivity monitor needs to ensure that the links are operational and this can be done via exchange of heartbeats. The connectivity monitor 128 is either a real-time user-land process using TCP (Transmission Control Protocol), which ensures that all failures up to the TCP layer are covered, or it will be based on an interrupt handling mechanism, it being noted that the latter will provide less coverage for software faults. The connectivity monitor 128 maintains the list of nodes and networks that it identifies as functioning and sends that information to the partition monitor through a mechanism other than the private network (possibly RS232). The partition monitor 22 ensures that there are no partitions in the system by collecting all the connectivity information and using its ability to turn off the PSUs of a node.

As has been mentioned above, partition monitor 22 is effective to ensure that there is only one fully connected network operating as a distributed fault tolerant system at any given time. The partition monitor 22 accomplishes its task by collecting the required connectivity information from each connectivity monitor, detecting any partitions and selecting an "optimal" sub-system if there is a partition. It will then turn the power off to those nodes that are not in the new and optimal distributed fault tolerant system and issues the appropriate messages to the (possibly remote) system administrator to inform him or her that errors have occurred in the communication system. In the present example, the partition monitor 22 is hosted in an external box and has some software capabilities. However, the partition monitor could alternatively be implemented as a simple hardware unit with all the required intelligence built into the hardware. The degree of intelligence allocated to the partition monitor 22 and its complexity are inversely proportional.

The management subsystem 126 works with the liveliness monitor 124 and the node hardware to provide a notion of membership to the nodes of the system. Its role in the membership monitoring activity of the system is to detect failures and to initiate a reconfiguration on the node that it is running. The reconfiguration framework itself is another component of the management subsystem and is flexible to allow for the application programs or other components of the system to place their recovery actions and specify the sequence of those actions.

Figure 6:
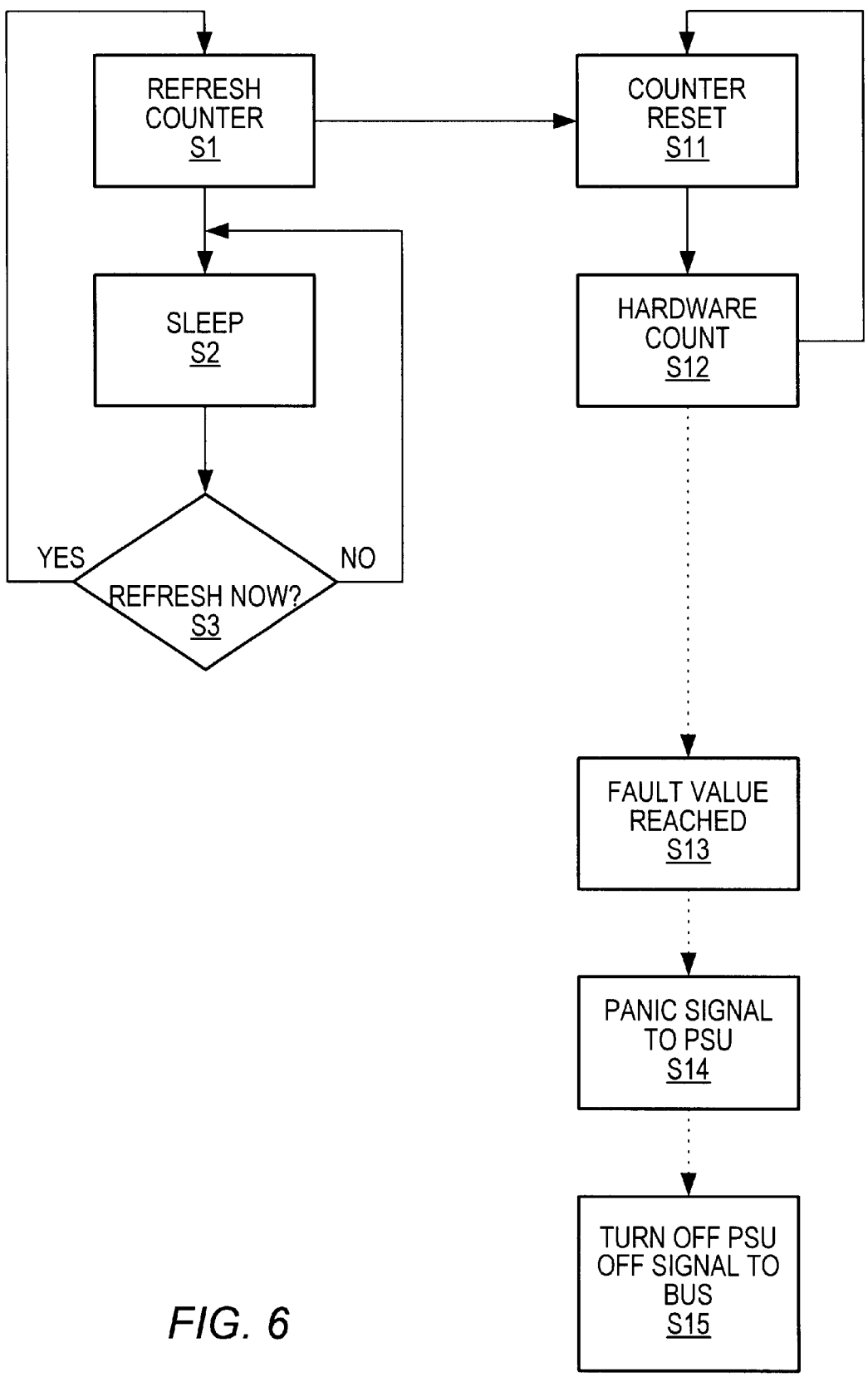
FIG. 6 is a flow diagram for explaining aspects of the operation of an embodiment of the invention.

FIG. 6 is a flow diagram illustrating the operation of the counter mechanism 92 for reporting the status, and where appropriate failure, of a power supply unit 36 to the bus 60.

Thus, in step S1, the counter 102A is refreshed by the liveliness monitor 124. The liveliness monitor 124 provides a software timing mechanism 52, which generates a reset signal for resetting the counter mechanism 92 at predetermined intervals. The liveliness monitor 124 can be implemented as a thread within the operating system of the processing unit of a node 30. In particular, it can be implemented as a conditional routine in the clock interrupt handler of the operating system. This can provide a high degree of reliability. Alternatively, the liveliness monitor 124 can be implemented as a user process, which has the advantage of providing a better fault coverage model. In the words, if there is the software or hardware faults, which will affect the operation of user processes, this will typically also cause a fault within the liveliness monitor 124, which will result in the necessary reset signal being generated late, or not at all. The liveliness monitor 124 could also be implemented as a combination of a user process, an interrupt routine and a real-time thread. This combined approach could utilize the benefits of both techniques.

In the present example, the liveliness monitor 124 is implemented as a user-land local daemon in a real-time scheduling class of the Solaris operating system, which is marketed by Sun Microsystems, Inc. and is responsible for ensuring that a node's essential hardware components are functional and that the operating system (OS) is alive and making progress.

In step S2, the liveliness monitor 124 sleeps.

On awaking, in step S3, a determination is made as to whether the desired reset timing has been reached. If the reset timing has not been reached, then step S2 is repeated. Otherwise, if the reset timing has been reached, step S1 is repeated, and accordingly the counter is refreshed, or reset.

Step S11 represents the resetting of the counter 106 to its reset value.

Step S12 represents a hardware count action in response to the clock CK.

If, on achieving a reset timing in step S3, the liveliness monitor causes refreshing of the counter in step S1, then the counter will be reset again in step S11.

If, however, a reset signal, which would normally be generated in step S1, is missing, for example due to a software or hardware error resulting in the liveliness monitor operating slowly, or not at all, the hardware count of the counter 106 will cause the counter to reach its fault value, as represented at step S13.

As a result of the fault value having been reached (step S13), the counter causes the generation of the fault, or panic, signal to the power supply unit 36 in step S14.

In step S15, the power supply unit (e.g., power supply unit 36A) which would otherwise output an ON indication to a line 50 on the bus 60 when operative, is caused to turn itself off, resulting in an OFF indication being supplied to the line 50 on the bus 60.

The process described above enables a node to be turned off in response to a hardware, or software fault.

Figure 7:
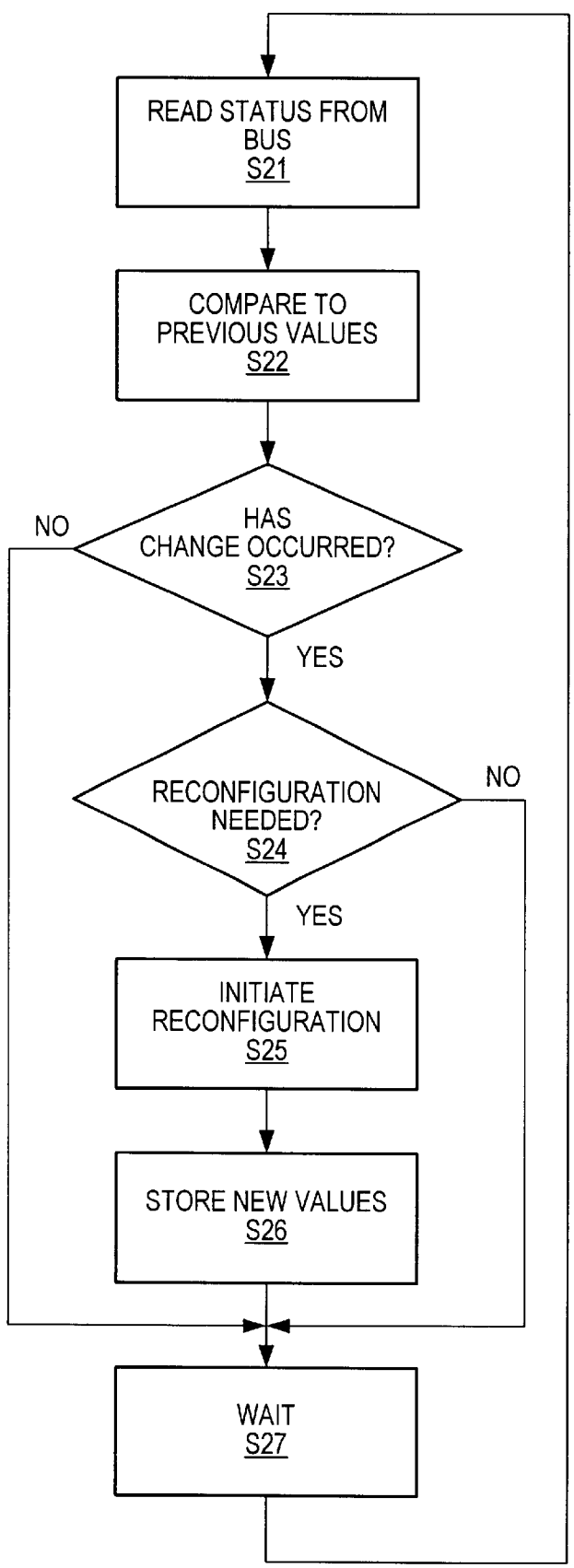
FIG. 7 is a further flow diagram for explaining aspects of the operation of an embodiment of the invention.

FIG. 7 illustrates aspects of the operation of the management subsystem 126. The management subsystem (AMS) is responsible for the initiation of reconfiguration and recovery actions in the case of a failure. Such actions are typically specified by the application programs or by scripts.

In step S21, the management subsystem 126 reads the status information from the various control lines 50 on the bus 60.

In step S22, the status information read from the bus is compared to corresponding previous values stored by the management subsystem in management subsystem storage. If the management subsystem 126 does not detect a change in step S23, then, after a wait period S27, the management subsystem 126 passes control back to step S21 and reads the status information from the bus again.

If, however, the management subsystem does detect a change in step S23, the management subsystem 126 is then operative, in step S24, to determine whether a reconfiguration is needed. This is conducted by the management subsystem comparing the process requirements of the configuration of the components active prior to the change can be effected by the components that are active after the change. The data in the global database manager is used to effect this evaluation.

If no reconfiguration is needed, then, after a wait period S27, the management subsystem 126 passes control back to step S21 and reads the status information from the bus again.

If, on the other hand, reconfiguration is needed, for example where the new status of the nodes of the system does not permit the necessary processing for the system as a whole to be performed, then the management subsystem initiates reconfiguration of the system. As mentioned before, this could be effected by alerting an operator so that the operator can effect this manually, or by activating an automated process. The actual manner in which reconfiguration is performed could be carried out in many different ways, and does not form a part of the present invention.

Following reconfiguration, after a wait period S27, the management subsystem 126 passes control back to step S21 and reads the status information from the bus again.

As mentioned above, in the present example each power supply unit 36A, 36B supplies status information to a respective control line 50 on the bus 60. However, in other examples, rather than providing one control line 50 per power supply unit 36, the status signals for multiple power supply units could be carried by one line, or on a set of lines using a time, code or phase division multiplexing approach, or the like. Such an approach would require further timing and/or coding and decoding logic for encoding the signals to be placed on the bus and for decoding the signals to be read from the bus.

An approach as described above enables a distributed fault tolerant system to be able to detect system failures quickly and to recover from them with no noticeable interruption to the services that it provides. The polling approach of the management subsystem further enables a rolling upgrade mechanism to be employed so that the individual components of the system can be removed, upgraded (or repaired), and brought back on line without a lengthy outage of system services.

Thus, an embodiment of the invention can be implemented in a distributed system with a minimum of additional hardware support, in the present instance, effectively the hardware counter mechanism. The system is capable of dealing with a unit of system failure in the form of a node, but can still provide for the detection of individual application failures and their recovery. Failure detection and recovery could also be extended to include failures that do not manifest themselves as a total node failure at the operating system level, but may lead to application failures or data corruption.

Detection and recovery actions of an application can be local or remote and as specified by the application through the use of a management subsystem within a node.

Thus, there has been described a system and method for monitoring a distributed fault tolerant computer system. A hardware counter mechanism (e.g. a countdown counter) is reset repeatedly by a software reset mechanism during normal operation, thereby preventing the counter mechanism from reaching a count indicative of the existence of a fault. A unit provides a signal to a bus indicative of the status (ON or OFF) of the unit. A management subsystem defines a configuration for the distributed fault tolerant computer system. The management subsystem is responsive to status signals on the bus and selectively reconfigures a stored representation in response to changing status signals on the bus.

An embodiment of the present invention finds particular, but not exclusive, application to the telecommunication industry. An embodiment of the invention can be arranged to meet the stringent real-time timing and availability requirements of that industry with a minimum of special purpose hardware and software is employed in such a distributed fault tolerant system.

An embodiment of the invention can, for example, achieve an availability in excess of 99.9996 percent (i.e. it should be unavailable less than 2.1 minutes a year) regardless of the source of unavailability due to the speed of fault detection and reporting. The average time required to detect the failure of an application (caused by a hardware, a system software, or an application failure) and to initiate the recovery of that application can be less than one second. Moreover, in a preferred embodiment of the invention, the management subsystem facilitates identification of failed components of the system. The automatic reconfiguration of the system facilitates system scalability.

It will be appreciated that although particular embodiments of the invention have been described, many modifications/additions and/or substitutions may be made within the spirit and scope of the present invention as defined in the appended claims.

For example, in the described embodiment, each node 30 has two counter mechanisms 92, and each counter mechanism has a single hardware counter. However, in other embodiments, another number of counter mechanisms could be provided. Also each counter mechanism could be provided with more than one hardware counter. In this case, each hardware counter 102 of a counter mechanism 92 could be reset by a reset signal from a respective liveliness process. Corresponding hardware counters 102 of each counter mechanism 92 of a node would, however, typically receive reset signals from a common liveliness process. The output 103 of each of plural hardware counters 102 of a counter mechanism 92 could be connected to a common gate 106 for the counter mechanism 92.

What is claimed is:

1. A monitor system for a distributed fault tolerant computer system, the monitor system comprising: a counter mechanism operable to count from a reset value towards a fault value and operable to output a fault signal on reaching said fault value;
   a counter reset routine implemented in software and operable repeatedly to reset the counter mechanism to its reset value during normal operation of the counter reset routine;
   a unit connectable to a bus to supply a status signal indicative of the status of the unit, the unit being responsive to a fault signal output from the counter mechanism to provide an OFF status indication to the bus; and
   a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals;
   wherein each unit of respective nodes is connected to a respective channel on the bus and the management subsystem is responsive to respective status signals on respective channels to determine the status of respective nodes.

2. The monitor system of claim 1, wherein each channel is a respective bus line.

3. The monitor system of claim 1, wherein the management subsystem is operable to redefine the configuration of the distributed fault tolerant system in response to detection of a change of state of a node.

4. The monitor system of claim 3, wherein the management subsystem is operable to compare system resources to system requirements following a change of state of a node to determine whether reconfiguration of the distributed fault tolerant system is required.

5. The monitor system of claim 1, wherein the management subsystem is operable to define a node as a member of the fault tolerant computer system when it is associated with an ON status signal.

6. The monitor system of claim 1, wherein the management subsystem is provided at a node of the distributed fault tolerant computer system.

7. The monitor subsystem of claim 6, wherein a said management subsystem is provided at each node of the fault tolerant computer system.

8. The monitor system of claim 1, wherein the counter mechanism comprises a hardware counter.

9. The monitor system of claim 8, wherein the counter mechanism comprises a gate responsive to the counter reaching the fault value to pass a fault signal to the unit.

10. The monitor system of claim 1, wherein the unit is a power supply unit.

11. The monitor system of claim 10, wherein the power supply unit is operable to turn off in response to a fault signal output by the counter mechanism.

12. A monitor system for a distributed fault tolerant computer system, the monitor system comprising: a first counter mechanism operable to count from a reset value towards a fault value and operable to output a fault signal on reaching said fault value; a second counter mechanism operable to count from a reset value towards a fault value and operable to output a fault signal on reaching said fault value; a counter reset routine implemented in software and operable repeatedly to reset the first and second counter mechanisms to its reset value during normal operation of the counter reset routine; a first unit connectable to a first channel on a bus to supply a status signal indicative of the status of the first unit, the first unit being responsive to a fault signal output from the first counter mechanism to provide an OFF status indication for the first unit to the first channel of the bus; and a second unit connectable to a first channel on the bus to supply a status signal indicative of the status of the second unit, the second unit being responsive to a fault signal output from the second counter mechanism to provide an OFF status indication for the second unit to the second channel of the bus.

13. The monitor system of claim 12, wherein each unit of each node is connected to a respective channel on the bus.

14. The monitor system of claim 13, wherein each channel is a respective bus line.

15. The monitor system of claim 12, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

16. The monitor system of claim 15, wherein each unit of respective nodes is connected to a respective channel on the bus and the management subsystem is responsive to respective status signals on respective channels to determine the status of respective nodes.

17. The monitor system of claim 15, wherein the management subsystem is operable to redefine the configuration of the distributed fault tolerant system in response to detection of a change of state of a node.

18. The monitor system of claim 17, wherein the management subsystem is operable to compare system resources to system requirements following a change of state of a node to determine whether reconfiguration of the distributed fault tolerant system is required.

19. The monitor system of claim 15, wherein the management subsystem is operable to define a node as a member of the fault tolerant computer system when it is associated with an ON status signal.

20. The monitor system of claim 12, wherein the management subsystem is provided at a node of the distributed fault tolerant computer system.

21. The monitor subsystem of claim 20, wherein a said management subsystem is provided at each node of the fault tolerant computer system.

22. The monitor system of claim 12, wherein the first counter mechanism comprises a first hardware counter and the second counter mechanism comprises a second hardware counter.

23. The monitor system of claim 22, wherein the first counter mechanism comprises a first gate responsive to the first counter reaching the fault value to pass a fault signal to the first unit and the second counter mechanism comprises a second gate responsive to the second counter reaching the fault value to pass a fault signal to the second unit.

24. The monitor system of claim 12, wherein the first unit is a first power supply unit and the second unit is a second power supply unit.

25. The monitor system of claim 24, wherein each power supply unit is operable to turn off in response to a fault signal output by the respective counter mechanism.

26. A node of a distributed fault tolerant computer system comprising: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on a bus to supply a status signal indicative of the status of the first unit, the first unit being responsive to a fault signal output from the first counter mechanism to provide an OFF status indication for the first unit to the first channel of the bus; and a second counter mechanism operable to count from a reset value towards a fault value and operable to output a fault signal on reaching said fault value; the counter reset routine being operable repeatedly to reset the second counter mechanism to its reset value during normal operation of the counter reset routine; and a second unit connectable to a first channel on the bus to supply a status signal indicative of the status of the second unit, the second unit being responsive to a fault signal output from the second counter mechanism to provide an OFF status indication for the second unit to the second channel of the bus.

27. The node of claim 26, wherein each unit is connected to a respective channel on the bus.

28. The node of claim 27, wherein each channel is a respective bus line.

29. The node of claim 26, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

30. The node of claim 29, wherein each unit of respective nodes of the distributed fault tolerant computer system is connected to a respective channel on the bus and the management subsystem is responsive to respective status signals on respective channels to determine the status of respective nodes.

31. The node of claim 29, wherein the management subsystem is operable to redefine the configuration of the distributed fault tolerant system in response to detection of a change of state of a node.

32. The node of claim 31, wherein the management subsystem is operable to compare system resources to system requirements following a change of state of a node to determine whether reconfiguration of the distributed fault tolerant system is required.

33. The node of claim 29, wherein the management subsystem is operable to define a node as a member of the fault tolerant computer system when it is associated with an ON status signal.

34. The node of claim 26, wherein the first counter mechanism comprises a hardware counter.

35. The node of claim 26, wherein the first counter mechanism comprises a first hardware counter and the second counter mechanism comprises a second hardware counter.

36. The node of claim 26, wherein the first unit is a first power supply unit.

37. The node of claim 26, wherein the first unit is a first power supply unit and the second unit is a second power supply unit.

38. The node of claim 37, wherein each power supply unit is operable to turn off in response to a fault signal output by the respective counter mechanism.

39. A distributed fault tolerant computer system comprising a plurality of nodes and a bus, wherein a node of the distributed fault tolerant computer system comprises: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on the bus to supply a status signal indicative of the status of the first unit, the first unit being responsive to a fault signal output from the first counter mechanism and being operable to provide an OFF status indication for the first unit to the first channel of the bus; wherein a node further comprises: a second counter mechanism operable to count from a reset value towards a fault value and operable to output a fault signal on reaching said fault value; the counter reset routine being operable repeatedly to reset the second counter mechanism to its reset value during normal operation of the counter reset routine; and a second unit connectable to a first channel on the bus to supply a status signal indicative of the status of the second unit, the second unit being responsive to a fault signal output from the second counter mechanism to provide an OFF status indication for the second unit to the second channel of the bus.

40. The distributed fault tolerant computer system of claim 39, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

41. The distributed fault tolerant computer system of claim 40, wherein each unit of respective nodes of the distributed fault tolerant computer system is connected to a respective channel on the bus and the management subsystem is responsive to respective status signals on respective channels to determine the status of respective nodes.

42. The distributed fault tolerant computer system of claim 40, wherein management subsystem is operable to redefine the configuration of the distributed fault tolerant system in response to detection of a change of state of a given node and to define the given node as a member of the fault tolerant computer system where at least one ON status signal is provided from a unit of the given node.

43. The distributed fault tolerant computer system of claim 39, wherein the management subsystem is provided at a node of the distributed fault tolerant computer system.

44. The distributed fault tolerant computer system of claim 43, wherein a said management subsystem is provided at each node of the fault tolerant computer system.

45. The distributed fault tolerant computer system of claim 39, wherein each said unit is a power supply unit operable to turn off in response to a fault signal output by the respective counter mechanism.

46. A monitor system for a distributed fault tolerant computer system, the monitor system comprising: a counter mechanism operable to count from a reset value towards a fault value and operable to output a fault signal on reaching said fault value; a counter reset routine implemented in software and operable repeatedly to reset the counter mechanism to its reset value during normal operation of the counter reset routine; a unit connectable to a bus to supply a status signal indicative of the status of the unit, the unit being responsive to a fault signal output from the counter mechanism to provide an OFF status indication to the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein the management subsystem is operable to redefine the configuration of the distributed fault tolerant system in response to detection of a change of state of a node; and wherein the management subsystem is operable to redefine the configuration of the distributed fault tolerant system in response to detection of a change of state of a node.

47. A monitor system for a distributed fault tolerant computer system, the monitor system comprising: a counter mechanism operable to count from a reset value towards a fault value and operable to output a fault signal on reaching said fault value; a counter reset routine implemented in software and operable repeatedly to reset the counter mechanism to its reset value during normal operation of the counter reset routine; a unit connectable to a bus to supply a status signal indicative of the status of the unit, the unit being responsive to a fault signal output from the counter mechanism to provide an OFF status indication to the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein the management subsystem is operable to define a node as a member of the fault tolerant computer system when it is associated with an ON status signal.

48. A monitor system for a distributed fault tolerant computer system, the monitor system comprising: a counter mechanism operable to count from a reset value towards a fault value and operable to output a fault signal on reaching said fault value; a counter reset routine implemented in software and operable repeatedly to reset the counter mechanism to its reset value during normal operation of the counter reset routine; and a unit connectable to a bus to supply a status signal indicative of the status of the unit, the unit being responsive to a fault signal output from the counter mechanism to provide an OFF status indication to the bus; wherein the unit is a power supply unit.

49. The monitor system of claim 48, wherein each unit of respective nodes is connected to a respective channel on the bus.

50. The monitor system of claim 49, wherein each channel is a respective bus line.

51. The monitor system of claim 48, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

52. The monitor system of claim 51, wherein the management subsystem is operable to redefine the configuration of the distributed fault tolerant system in response to detection of a change of state of a node.

53. The monitor system of claim 51, wherein the management subsystem is operable to define a node as a member of the fault tolerant computer system when it is associated with an ON status signal.

54. The monitor system of claim 48, wherein the power supply unit is operable to turn off in response to a fault signal output by the counter mechanism.

55. A node of a distributed fault tolerant computer system comprising: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a bus to supply a status signal indicative of the status of the first unit, the first unit being responsive to a fault signal output from the first counter mechanism to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein each unit of respective nodes of the distributed fault tolerant computer system is connected to a respective channel on the bus and the management subsystem is responsive to respective status signals on respective channels to determine the status of respective nodes.

56. A node of a distributed fault tolerant computer system comprising: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on a bus to supply a status signal indicative of the status of the first unit, the first unit being responsive to a fault signal output from the first counter mechanism to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein the management subsystem is operable to redefine the configuration of the distributed fault tolerant system in response to detection of a change of state of a node; and wherein the management subsystem is operable to compare system resources to system requirements following a change of state of a node to determine whether reconfiguration of the distributed fault tolerant system is required.

57. A node of a distributed fault tolerant computer system comprising: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on a bus to supply a status signal indicative of the status of the first unit, the first unit being responsive to a fault signal output from the first counter mechanism to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein the management subsystem is operable to define a node as a member of the fault tolerant computer system when it is associated with an ON status signal.

58. A node of a distributed fault tolerant computer system comprising: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; and a first unit connectable to a first channel on a bus to supply a status signal indicative of the status of the first unit, the first unit being responsive to a fault signal output from the first counter mechanism to provide an OFF status indication for the first unit to the first channel of the bus; wherein the first unit is a first power supply unit.

59. The node of claim 58, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

60. A distributed fault tolerant computer system comprising a plurality of nodes and a bus, wherein a node of the distributed fault tolerant computer system comprises: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on the bus to supply a status signal indicative of the status of the first unit, the first unit being responsive to a fault signal output from the first counter mechanism and being operable to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein each unit of respective nodes of the distributed fault tolerant computer system is connected to a respective channel on the bus and the management subsystem is responsive to respective status signals on respective channels to determine the status of respective nodes.

61. A distributed fault tolerant computer system comprising a plurality of nodes and a bus, wherein a node of the distributed fault tolerant computer system comprises: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on the bus to supply a status signal indicative of the status of the first unit, the first unit being responsive to a fault signal output from the first counter mechanism and being operable to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein management subsystem is operable to redefine the configuration of the distributed fault tolerant system in response to detection of a change of state of a given node and to define the given node as a member of the fault tolerant computer system where at least one ON status signal is provided from a unit of the given node.

62. A distributed fault tolerant computer system comprising a plurality of nodes and a bus, wherein a node of the distributed fault tolerant computer system comprises: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine; a first unit connectable to a first channel on the bus to supply a status signal indicative of the status of the first unit, the first unit being responsive to a fault signal output from the first counter mechanism and being operable to provide an OFF status indication for the first unit to the first channel of the bus; and a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals; wherein the management subsystem is provided at a node of the distributed fault tolerant computer system.

63. The distributed fault tolerant computer system of claim 62, wherein a said management subsystem is provided at each node of the fault tolerant computer system.

64. A distributed fault tolerant computer system comprising a plurality of nodes and a bus, wherein a node of the distributed fault tolerant computer system comprises: a first counter mechanism operable to count from a reset value towards a fault value and operable to output a fault signal on reaching said fault value; a counter reset routine implemented in software and operable repeatedly to reset the first counter mechanism to its reset value during normal operation of the counter reset routine;

and a first unit connectable to a first channel on the bus to supply a status signal indicative of the status of the first unit, the first unit being responsive to a fault signal output from the first counter mechanism and being operable to provide an OFF status indication for the first unit to the first channel of the bus; wherein each said unit is a power supply unit operable to turn off in response to a fault signal output by the respective counter mechanism.

65. The distributed fault tolerant computer system of claim 64, comprising a management subsystem, the management subsystem defining a configuration for the distributed fault tolerant computer system, the management subsystem being responsive to status signals on the bus and being operable selectively to redefine the configuration of the distributed fault tolerant system dependent upon the state of the status signals.

* * * * *